United States Patent
Kurian et al.

(10) Patent No.: US 11,153,281 B2
(45) Date of Patent: Oct. 19, 2021

(54) DEPLOYING AND UTILIZING A DYNAMIC DATA STENCILING SYSTEM WITH A SMART LINKING ENGINE

(71) Applicant: Bank of America Corporation, Charlotte, NC (US)

(72) Inventors: Manu Kurian, Dallas, TX (US); Lalit Dhawan, Franklin Park, NJ (US)

(73) Assignee: Bank of America Corporation, Charlotte, NC (US)

( * ) Notice: Subject to any disclaimer, the term of this patent is extended or adjusted under 35 U.S.C. 154(b) by 382 days.

(21) Appl. No.: 16/211,295

(22) Filed: Dec. 6, 2018

(65) Prior Publication Data

US 2020/0186495 A1    Jun. 11, 2020

(51) Int. Cl.
  *H04L 29/06*  (2006.01)
  *G06Q 20/40*  (2012.01)
(52) U.S. Cl.
  CPC .......... *H04L 63/029* (2013.01); *G06Q 20/40* (2013.01)
(58) Field of Classification Search
  CPC ... H04L 63/029; H04L 29/06; H04L 2209/04; H04L 2209/16; H04L 29/02; H04L 67/22; G06Q 20/40; G06F 29/06; G06F 9/4443
  See application file for complete search history.

(56) References Cited

U.S. PATENT DOCUMENTS

| | | | |
|---|---|---|---|
| 7,457,826 B2 | 11/2008 | Hudis et al. | |
| 7,668,849 B1 | 2/2010 | Narancic et al. | |
| 7,831,995 B2 * | 11/2010 | Futoransky | H04L 63/102 726/1 |
| 8,078,650 B2 | 12/2011 | McHugh et al. | |
| 8,122,510 B2 | 2/2012 | Byers et al. | |
| 9,569,511 B2 | 2/2017 | Morin | |
| 9,916,379 B2 | 3/2018 | Neeman et al. | |
| 9,934,309 B2 | 4/2018 | Neeman et al. | |
| 2009/0055932 A1 * | 2/2009 | Kuroda | H04N 19/00 726/26 |
| 2011/0154467 A1 * | 6/2011 | Bomar | G06Q 20/385 726/9 |
| 2014/0006369 A1 | 1/2014 | Blanchflower et al. | |
| 2017/0195394 A1 * | 7/2017 | Kothari | H04L 65/1069 |
| 2017/0344384 A1 * | 11/2017 | Wadley | G06F 8/38 |

(Continued)

*Primary Examiner* — Quazi Farooqui
(74) *Attorney, Agent, or Firm* — Banner & Witcoff, Ltd.; Michael A. Springs

(57) ABSTRACT

Aspects of the disclosure relate to deploying and utilizing a dynamic data stenciling system with a smart linking engine. A computing platform may receive source data from one or more data source systems. Subsequently, the computing platform may identify a target application hosted by an enterprise application host platform as being an intended recipient of a portion of the source data. Then, the computing platform may select a dynamic data stencil from a plurality of available data stencils. Thereafter, the computing platform may overlay the portion of the source data onto the target application using the dynamic data stencil. In addition, by overlaying the portion of the source data onto the target application using the dynamic data stencil, the computing platform may cause the target application to execute one or more data processing functions using the portion of the source data received from the one or more data source systems.

17 Claims, 9 Drawing Sheets

(56) References Cited

U.S. PATENT DOCUMENTS

| | | | |
|---|---|---|---|
| 2018/0143808 A1* | 5/2018 | Puri | G06F 8/20 |
| 2018/0330724 A1 | 11/2018 | Miller et al. | |
| 2018/0331953 A1 | 11/2018 | Hoang et al. | |
| 2018/0331979 A1 | 11/2018 | Rakovitsky et al. | |
| 2018/0332447 A1 | 11/2018 | Rakovitsky et al. | |
| 2018/0333475 A1 | 11/2018 | Dorsey et al. | |
| 2018/0333479 A1 | 11/2018 | Garcia-Sastre et al. | |
| 2018/0333493 A1 | 11/2018 | Shenoy | |
| 2018/0333502 A1 | 11/2018 | Lonberg et al. | |
| 2018/0333507 A1 | 11/2018 | Lowman et al. | |
| 2018/0333587 A1 | 11/2018 | Howard | |
| 2018/0335420 A1 | 11/2018 | Bar-Sagi et al. | |
| 2018/0336059 A1 | 11/2018 | Thomas et al. | |
| 2018/0336320 A1 | 11/2018 | Le Henaff et al. | |
| 2018/0336360 A1 | 11/2018 | Kolishchak | |
| 2018/0336625 A1 | 11/2018 | Singh et al. | |
| 2018/0337830 A1 | 11/2018 | Padhye et al. | |
| 2018/0337854 A1 | 11/2018 | Cohn et al. | |
| 2018/0337891 A1 | 11/2018 | Subbarayan et al. | |
| 2018/0337976 A1 | 11/2018 | Crawford et al. | |
| 2018/0337977 A1 | 11/2018 | Crawford et al. | |
| 2018/0341182 A1 | 11/2018 | Sanguinetti et al. | |
| 2018/0341505 A1 | 11/2018 | Ebersohn | |
| 2018/0341526 A1 | 11/2018 | Li et al. | |
| 2018/0341650 A1 | 11/2018 | Faith et al. | |
| 2018/0342050 A1 | 11/2018 | Fitzgerald et al. | |
| 2018/0343238 A1 | 11/2018 | Tola | |
| 2018/0343278 A1 | 11/2018 | Vallone et al. | |
| 2018/0343567 A1 | 11/2018 | Ashrafi | |
| 2018/0343636 A1 | 11/2018 | Goldstein | |
| 2018/0343685 A1 | 11/2018 | Hart et al. | |

* cited by examiner

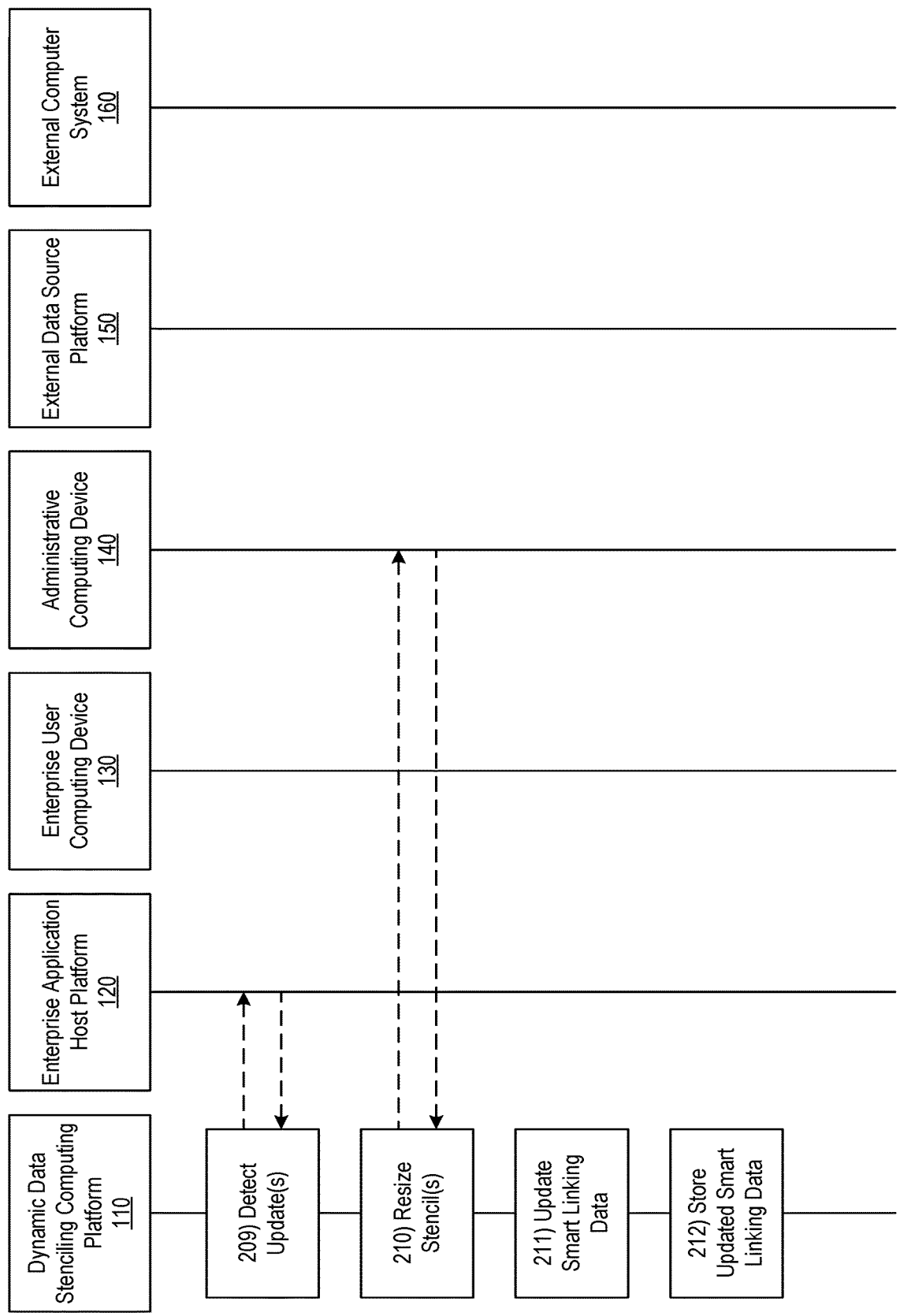

DEPLOYING AND UTILIZING A DYNAMIC DATA STENCILING SYSTEM WITH A SMART LINKING ENGINE

BACKGROUND

Aspects of the disclosure relate to deploying digital data processing systems, providing information security, and preventing unauthorized access to resources of an information system. In particular, one or more aspects of the disclosure relate to preventing unauthorized access to information resources by deploying and utilizing a dynamic data stenciling system with a smart linking engine.

Enterprise organizations may utilize various computing infrastructure to maintain large data sets, which may include confidential information and/or other sensitive data that is created and/or used for various purposes. In some instances, these large data sets may need to be accessed by and/or transferred across various networks and/or between various computer systems. Ensuring security when accessing and/or transferring such data may be critically important to protect the integrity and confidentiality of the underlying information. In many instances, however, it may be difficult to ensure the integrity and confidentiality of the information associated with the data sets while also attempting to optimize the resource utilization, bandwidth utilization, and efficient operations of the computing infrastructure involved in maintaining, accessing, and transferring the data.

SUMMARY

Aspects of the disclosure provide effective, efficient, scalable, and convenient technical solutions that address and overcome the technical problems associated with ensuring information security and preventing unauthorized access to resources of enterprise computer systems by deploying and utilizing a dynamic data stenciling system with a smart linking engine.

In accordance with one or more embodiments, a computing platform having at least one processor, a communication interface, and memory may receive, via the communication interface, from one or more data source systems, first source data. Subsequently, the computing platform may identify a target application hosted by an enterprise application host platform as being an intended recipient of a portion of the first source data received from the one or more data source systems. Then, the computing platform may select a dynamic data stencil from a plurality of available data stencils based on identifying the target application hosted by the enterprise application host platform as being the intended recipient of the portion of the first source data received from the one or more data source systems. Thereafter, the computing platform may overlay the portion of the first source data received from the one or more data source systems onto the target application hosted by the enterprise application host platform using the dynamic data stencil selected from the plurality of available data stencils. In addition, by overlaying the portion of the first source data received from the one or more data source systems onto the target application hosted by the enterprise application host platform using the dynamic data stencil selected from the plurality of available data stencils, the computing platform may cause the target application hosted by the enterprise application host platform to execute one or more data processing functions using the portion of the first source data received from the one or more data source systems.

In some embodiments, receiving the first source data from the one or more data source systems may include receiving at least part of the first source data from an enterprise user computing device that is associated with an internal enterprise user and located inside of an enterprise firewall.

In some embodiments, receiving the first source data from the one or more data source systems may include receiving at least part of the first source data from an external data source platform that is associated with an external third-party entity and located outside of an enterprise firewall.

In some embodiments, receiving the first source data from the one or more data source systems may include receiving at least part of the first source data from an external computer system that is associated with an external enterprise user and located outside of an enterprise firewall.

In some embodiments, identifying the target application hosted by the enterprise application host platform as being the intended recipient of the portion of the first source data received from the one or more data source systems may include determining that the target application hosted by the enterprise application host platform is the intended recipient of the portion of the first source data received from the one or more data source systems based on contents of the first source data received from the one or more data source systems.

In some embodiments, identifying the target application hosted by the enterprise application host platform as being the intended recipient of the portion of the first source data received from the one or more data source systems may include determining that the target application hosted by the enterprise application host platform is the intended recipient of the portion of the first source data received from the one or more data source systems based on a user request.

In some embodiments, overlaying the portion of the first source data received from the one or more data source systems onto the target application hosted by the enterprise application host platform using the dynamic data stencil selected from the plurality of available data stencils may include: generating a first structured data object having one or more attributes corresponding to one or more fields of the dynamic data stencil selected from the plurality of available data stencils; populating the one or more attributes of the first structured data object with information selected from the first source data received from the one or more data source systems; and sending, via the communication interface, to the enterprise application host platform, the first structured data object.

In some embodiments, populating the one or more attributes of the first structured data object with information selected from the first source data received from the one or more data source systems may include: generating a first unique link to first secure data extracted from the first source data received from the one or more data source systems; and inserting the first unique link into the first structured data object. In addition, the first secure data extracted from the first source data received from the one or more data source systems may be retained by the computing platform after the first structured data object is sent to the enterprise application host platform.

In some embodiments, generating the first unique link to the first secure data extracted from the first source data received from the one or more data source systems may include setting a first expiration time for the first unique link.

In some embodiments, populating the one or more attributes of the first structured data object with information selected from the first source data received from the one or more data source systems may include: prior to generating the first unique link to the first secure data extracted from the first source data received from the one or more data source systems, determining, by a smart linking engine executing on the computing platform, to generate the first unique link to the first secure data extracted from the first source data received from the one or more data source systems based on at least one previous data overlay event.

In some embodiments, after overlaying the portion of the first source data received from the one or more data source systems onto the target application hosted by the enterprise application host platform using the dynamic data stencil selected from the plurality of available data stencils, the computing platform may detect an update associated with the target application hosted by the enterprise application host platform. In response to detecting the update associated with the target application hosted by the enterprise application host platform, the computing platform may resize one or more data stencils associated with the target application hosted by the enterprise application host platform.

In some embodiments, the computing platform may receive, via the communication interface, from the one or more data source systems, second source data. Subsequently, the computing platform may identify the target application hosted by the enterprise application host platform as being the intended recipient of a portion of the second source data received from the one or more data source systems. Then, the computing platform may select the dynamic data stencil from the plurality of available data stencils based on identifying the target application hosted by the enterprise application host platform as being the intended recipient of the portion of the second source data received from the one or more data source systems. Thereafter, the computing platform may overlay the portion of the second source data received from the one or more data source systems onto the target application hosted by the enterprise application host platform using the dynamic data stencil selected from the plurality of available data stencils. In addition, by overlaying the portion of the second source data received from the one or more data source systems onto the target application hosted by the enterprise application host platform using the dynamic data stencil selected from the plurality of available data stencils, the computing platform may cause the target application hosted by the enterprise application host platform to execute the one or more data processing functions using the portion of the second source data received from the one or more data source systems.

In some embodiments, overlaying the portion of the second source data received from the one or more data source systems onto the target application hosted by the enterprise application host platform using the dynamic data stencil selected from the plurality of available data stencils may include: generating a second structured data object having one or more attributes corresponding to one or more fields of the dynamic data stencil selected from the plurality of available data stencils; populating the one or more attributes of the second structured data object with information selected from the second source data received from the one or more data source systems; and sending, via the communication interface, to the enterprise application host platform, the second structured data object.

In some embodiments, populating the one or more attributes of the second structured data object with information selected from the second source data received from the one or more data source systems may include: generating a second unique link to second secure data extracted from the second source data received from the one or more data source systems; and inserting the second unique link into the second structured data object. In addition, the second secure data extracted from the second source data received from the one or more data source systems may be retained by the computing platform after the second structured data object is sent to the enterprise application host platform.

In some embodiments, generating the second unique link to the second secure data extracted from the second source data received from the one or more data source systems may include setting a second expiration time for the second unique link.

In some embodiments, populating the one or more attributes of the second structured data object with information selected from the second source data received from the one or more data source systems may include: prior to generating the second unique link to the second secure data extracted from the second source data received from the one or more data source systems, determining, by a smart linking engine executing on the computing platform, to generate the second unique link to the second secure data extracted from the second source data received from the one or more data source systems based on at least one previous data overlay event.

In some embodiments, determining, by the smart linking engine executing on the computing platform, to generate the second unique link to the second secure data extracted from the second source data received from the one or more data source systems based on the at least one previous data overlay event may include determining to generate the second unique link to the second secure data extracted from the second source data received from the one or more data source systems based on a previous data overlay event involving the first source data received from the one or more data source systems.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for preventing unauthorized access to information resources by deploying and utilizing a dynamic data stenciling system with a smart linking engine in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to dynamic re-sizing and re-templating of data based on data type using a dynamic data stenciling system. For example, processing of streams for pooling data across multiple platforms or applications may be automated by a dynamic data stenciling system. The system may read data, extract data, enter data into one or more other applications, and/or recompile data between different applications. The system may perform dynamic, advanced screen scraping using optical character recognition (OCR) techniques, may translate information onto documents, and/or may overlay data elements to a target application. The system may implement a translation layer that adjusts data properties. For example, if a user is applying for a loan for a car, the credit application process applied to the user may depend on their individual risk rating. In this example, the system may take unstructured data associated with the user, create a stencil of the dataset, and then overlay data into a target application used to apply for and/or process the loan.

Figure 1A:
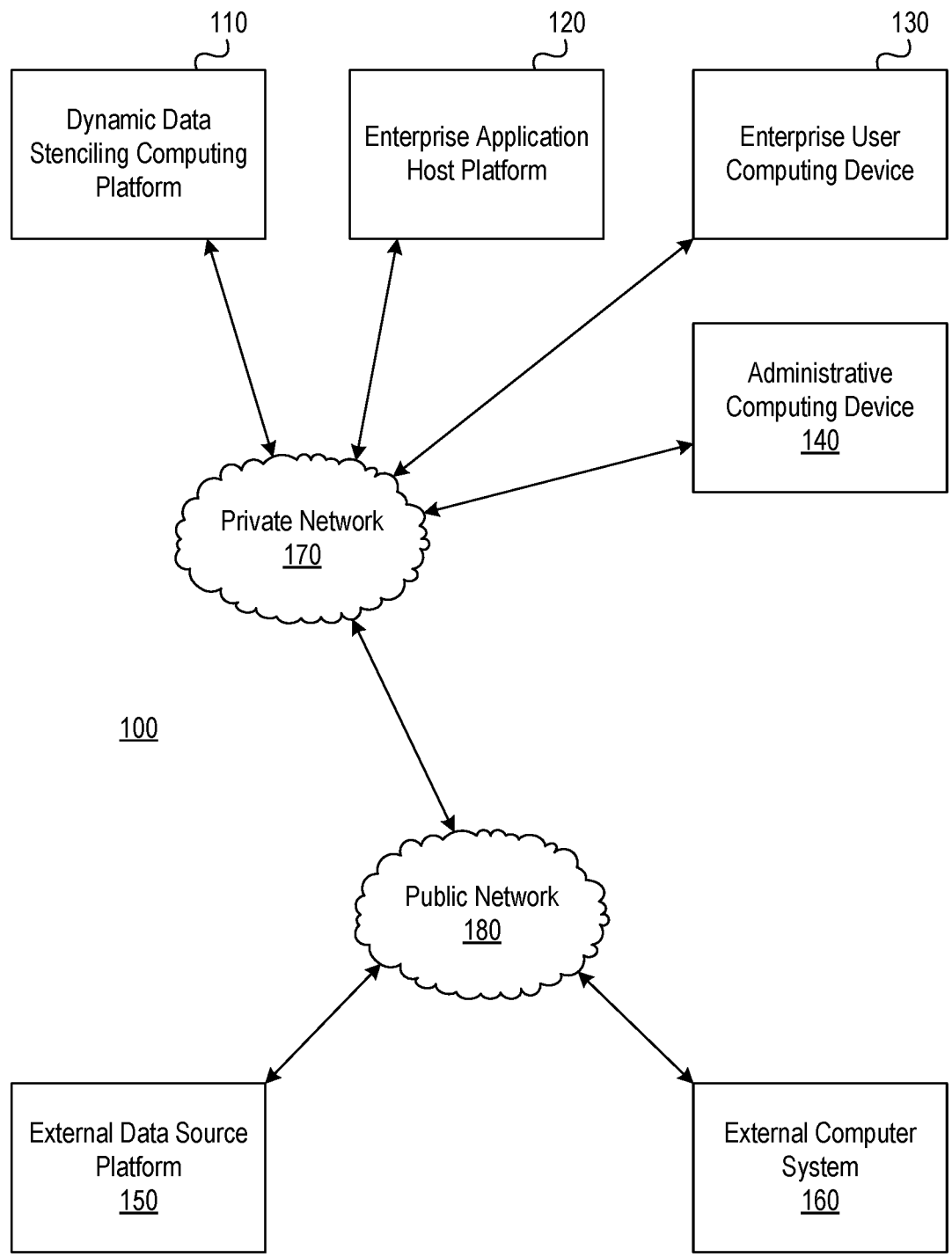
FIGS. 1A and 1B depict an illustrative computing environment for preventing unauthorized access to information resources by deploying and utilizing a dynamic data stenciling system with a smart linking engine in accordance with one or more example embodiments.
Figure 1B:
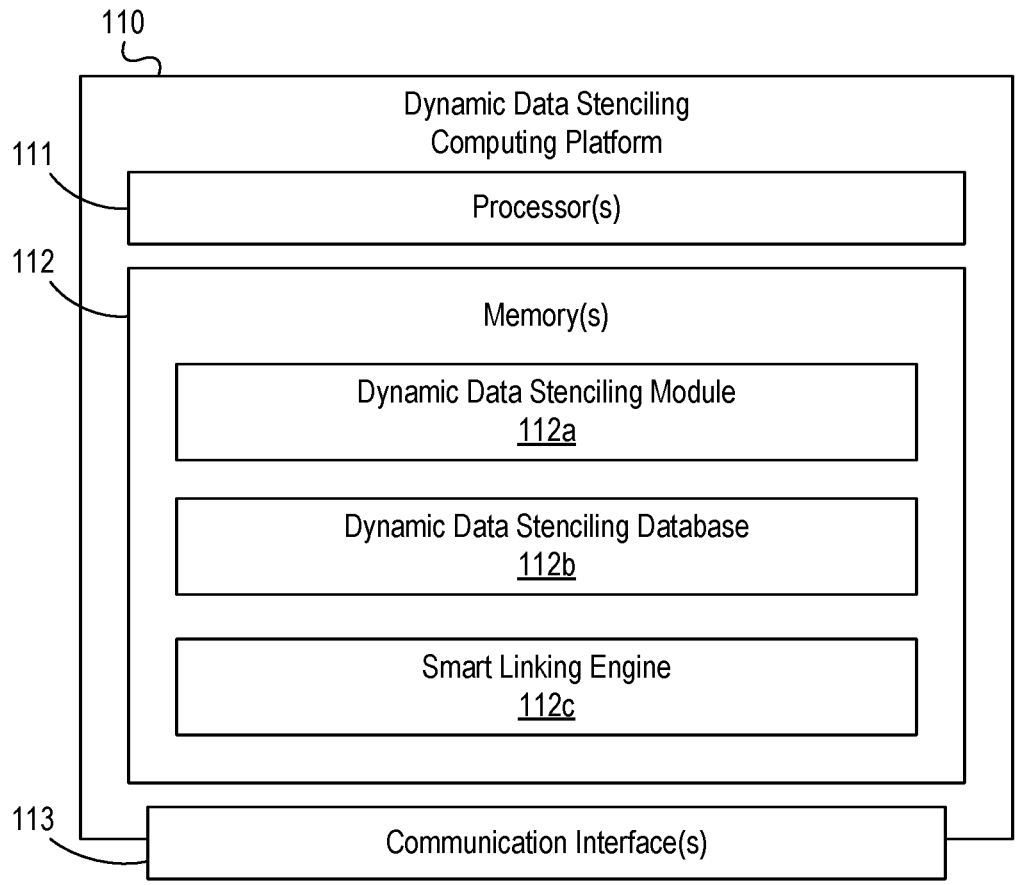

FIGS. 1A and 1B depict an illustrative computing environment for preventing unauthorized access to information resources by deploying and utilizing a dynamic data stenciling system with a smart linking engine in accordance with one or more example embodiments. Referring to FIG. 1A, computing environment 100 may include one or more computer systems. For example, computing environment 100 may include a dynamic data stenciling computing platform 110, an enterprise application host platform 120, an enterprise user computing device 130, an administrative computing device 140, an external data source platform 150, and an external computer system 160.

As illustrated in greater detail below, dynamic data stenciling computing platform 110 may include one or more computing devices configured to perform one or more of the functions described herein. For example, dynamic data stenciling computing platform 110 may include one or more computers (e.g., laptop computers, desktop computers, servers, server blades, or the like).

Enterprise application host platform 120 may include one or more computing devices and/or other computer components (e.g., processors, memories, communication interfaces). In addition, and as illustrated in greater detail below, enterprise application host platform 120 may be configured to host, execute, and/or otherwise provide one or more enterprise applications. For example, enterprise application host platform 120 may be configured to host, execute, and/or otherwise provide one or more transaction processing programs, loan application processing programs, and/or other programs associated with an enterprise organization, such as a financial institution. In some instances, enterprise application host platform 120 may be configured to provide various enterprise and/or back-office computing functions for an enterprise organization, such as a financial institution. For example, enterprise application host platform 120 may include various servers and/or databases that store and/or otherwise maintain account information, such as financial account information including account balances, transaction history, account owner information, and/or other information. In addition, enterprise application host platform 120 may process and/or otherwise execute transactions on specific accounts based on commands and/or other information received from other computer systems included in computing environment 100. Additionally or alternatively, enterprise application host platform 120 may receive data from dynamic data stenciling computing platform 110, manipulate and/or otherwise process such data, and/or return processed data and/or other data to dynamic data stenciling computing platform 110 and/or to other computer systems included in computing environment 100.

Enterprise user computing device 130 may be a personal computing device (e.g., desktop computer, laptop computer) or mobile computing device (e.g., smartphone, tablet). In addition, enterprise user computing device 130 may be linked to and/or used by a specific enterprise user (who may, e.g., be an employee or other affiliate of an enterprise organization operating dynamic data stenciling computing platform 110). Administrative computing device 140 may be a personal computing device (e.g., desktop computer, laptop computer) or mobile computing device (e.g., smartphone, tablet). In addition, administrative computing device 140 may be linked to and/or used by an administrative user (who may, e.g., be a network administrator of an enterprise organization operating dynamic data stenciling computing platform 110).

External data source platform 150 may include one or more computing devices and/or other computer components (e.g., processors, memories, communication interfaces). In addition, external data source platform 150 may be linked to and/or used by one or more external users (e.g., who might not be associated with an enterprise organization operating dynamic data stenciling computing platform 110). External computer system 160 may be a personal computing device (e.g., desktop computer, laptop computer) or mobile computing device (e.g., smartphone, tablet). In addition, external computer system 160 may be linked to and/or used by an external user (who may, e.g., be a customer or other external user of an enterprise organization operating dynamic data stenciling computing platform 110 and who may interact with one or more enterprise resources while using a device located outside of an enterprise firewall associated with dynamic data stenciling computing platform 110).

Computing environment 100 also may include one or more networks, which may interconnect one or more of dynamic data stenciling computing platform 110, enterprise application host platform 120, enterprise user computing device 130, administrative computing device 140, external data source platform 150, and external computer system 160. For example, computing environment 100 may include a private network 170 (which may, e.g., interconnect dynamic data stenciling computing platform 110, enterprise application host platform 120, enterprise user computing device 130, administrative computing device 140, and/or one or more other systems which may be associated with an organization, such as a financial institution) and public network 180 (which may, e.g., interconnect external data source platform 150 and external computer system 160 with private network 170 and/or one or more other systems, public networks, sub-networks, and/or the like).

In one or more arrangements, enterprise application host platform 120, enterprise user computing device 130, administrative computing device 140, external data source platform 150, external computer system 160, and/or the other systems included in computing environment 100 may be any type of computing device capable of receiving a user interface, receiving input via the user interface, and communicating the received input to one or more other computing devices. For example, enterprise application host platform 120, enterprise user computing device 130, administrative computing device 140, external data source platform 150, external computer system 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of dynamic data stenciling computing platform 110, enterprise application host platform 120, enterprise user computing device 130, administrative computing device 140, external data source platform 150, and external computer system 160 may, in some instances, be special-purpose computing devices configured to perform specific functions.

Referring to FIG. 1B, dynamic data stenciling computing platform 110 may include one or more processors 111, memory 112, and communication interface 113. A data bus may interconnect processor 111, memory 112, and communication interface 113. Communication interface 113 may be a network interface configured to support communication between dynamic data stenciling computing platform 110 and one or more networks (e.g., network 170, network 180, or the like). Memory 112 may include one or more program modules having instructions that when executed by processor 111 cause dynamic data stenciling computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of dynamic data stenciling computing platform 110 and/or by different computing devices that may form and/or otherwise make up dynamic data stenciling computing platform 110. For example, memory 112 may have, store, and/or include a dynamic data stenciling module 112a, a dynamic data stenciling database 112b, and a smart linking engine 112c. Dynamic data stenciling module 112a may have instructions that direct and/or cause dynamic data stenciling computing platform 110 to prevent unauthorized access to information resources using dynamic data stenciling and smart linking, as discussed in greater detail below. Dynamic data stenciling database 112b may store information used by dynamic data stenciling module 112a and/or dynamic data stenciling computing platform 110 in preventing unauthorized access to information resources using dynamic data stenciling and smart linking. Smart linking engine 112c may generate one or more unique links to mask and/or otherwise protect secure data, store and/or otherwise retain on dynamic data stenciling computing platform 110 secure data for which one or more links have been generated, and/or build and/or update one or more machine-learned models for executing smart linking functions.

Figure 2A:
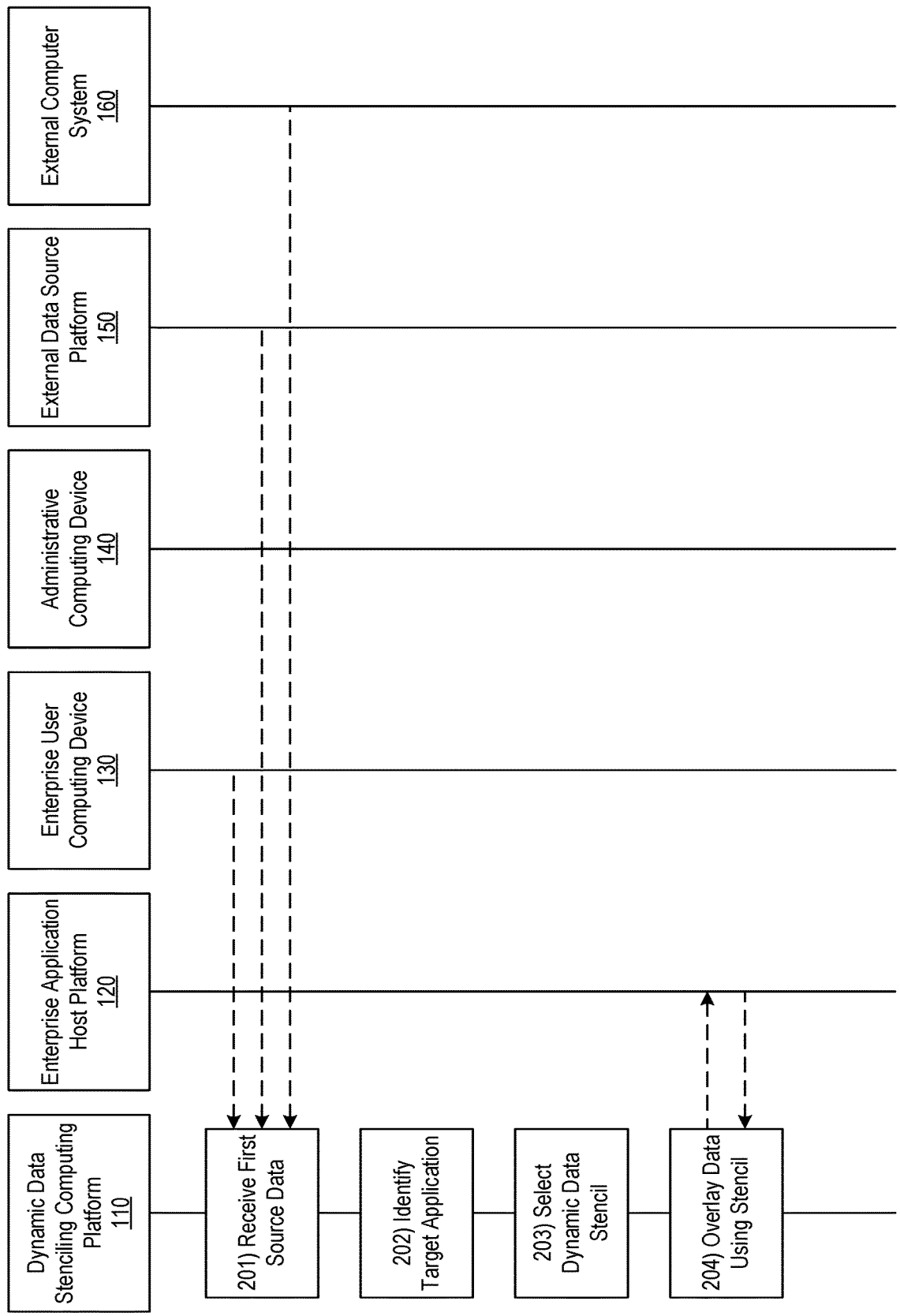

FIGS. 2A-2E depict an illustrative event sequence for preventing unauthorized access to information resources by deploying and utilizing a dynamic data stenciling system with a smart linking engine in accordance with one or more example embodiments. Referring to FIG. 2A, at step 201, dynamic data stenciling computing platform 110 may receive first source data. For example, at step 201, dynamic data stenciling computing platform 110 may receive, via the communication interface (e.g., communication interface 113), from one or more data source systems (e.g., enterprise user computing device 130, external data source platform 150, external computer system 160), first source data.

In some embodiments, receiving the first source data from the one or more data source systems may include receiving at least part of the first source data from an enterprise user computing device that is associated with an internal enterprise user and located inside of an enterprise firewall. For example, in receiving the first source data from the one or more data source systems, dynamic data stenciling computing platform 110 may receive at least part of the first source data from an enterprise user computing device (e.g., enterprise user computing device 130) that is associated with an internal enterprise user and located inside of an enterprise firewall (which may, e.g., protect and/or otherwise be associated with dynamic data stenciling computing platform 110 and/or enterprise application host platform 120).

In some embodiments, receiving the first source data from the one or more data source systems may include receiving at least part of the first source data from an external data source platform that is associated with an external third-party entity and located outside of an enterprise firewall. For example, in receiving the first source data from the one or more data source systems, dynamic data stenciling computing platform 110 may receive at least part of the first source data from an external data source platform (e.g., external data source platform 150) that is associated with an external third-party entity and located outside of an enterprise firewall (e.g., the outside of the enterprise firewall that may protect and/or otherwise be associated with dynamic data stenciling computing platform 110 and/or enterprise application host platform 120).

In some embodiments, receiving the first source data from the one or more data source systems may include receiving at least part of the first source data from an external computer system that is associated with an external enterprise user and located outside of an enterprise firewall. For example, in receiving the first source data from the one or more data source systems, dynamic data stenciling computing platform 110 may receive at least part of the first source data from an external computer system (e.g., external computer system 160) that is associated with an external enterprise user and located outside of an enterprise firewall (e.g., the outside of the enterprise firewall that may protect and/or otherwise be associated with dynamic data stenciling computing platform 110 and/or enterprise application host platform 120).

At step 202, dynamic data stenciling computing platform 110 may identify a target application. For example, at step 202, dynamic data stenciling computing platform 110 may identify a target application hosted by an enterprise application host platform (e.g., enterprise application host platform 120) as being an intended recipient of a portion of the first source data received from the one or more data source systems (e.g., enterprise user computing device 130, external data source platform 150, external computer system 160).

In some embodiments, identifying the target application hosted by the enterprise application host platform as being the intended recipient of the portion of the first source data received from the one or more data source systems may include determining that the target application hosted by the enterprise application host platform is the intended recipient of the portion of the first source data received from the one or more data source systems based on contents of the first source data received from the one or more data source systems. For example, in identifying the target application hosted by the enterprise application host platform (e.g., enterprise application host platform 120) as being the intended recipient of the portion of the first source data received from the one or more data source systems (e.g., enterprise user computing device 130, external data source platform 150, external computer system 160) at step 202, dynamic data stenciling computing platform 110 may determine that the target application hosted by the enterprise application host platform (e.g., enterprise application host platform 120) is the intended recipient of the portion of the first source data received from the one or more data source systems (e.g., enterprise user computing device 130, external data source platform 150, external computer system 160) based on contents of the first source data received from the one or more data source systems (e.g., enterprise user computing device 130, external data source platform 150, external computer system 160). For instance, dynamic data stenciling computing platform 110 may analyze and/or otherwise evaluate the contents of the source data to identify and/or otherwise determine the target application. For instance, based on identifying user data in the contents of the source data, dynamic data stenciling computing platform 110 may identify a user data processing application as the target application; based on identifying transaction data in the contents of the source data, dynamic data stenciling computing platform 110 may identify a transaction data processing application as the target application; based on identifying loan application data in the contents of the source data, dynamic data stenciling computing platform 110 may identify a loan application data processing application as the target application; based on identifying mortgage application data in the contents of the source data, dynamic data stenciling computing platform 110 may identify a mortgage application data processing application as the target application; and/or the like.

In some embodiments, identifying the target application hosted by the enterprise application host platform as being the intended recipient of the portion of the first source data received from the one or more data source systems may include determining that the target application hosted by the enterprise application host platform is the intended recipient of the portion of the first source data received from the one or more data source systems based on a user request. For example, in identifying the target application hosted by the enterprise application host platform (e.g., enterprise application host platform 120) as being the intended recipient of the portion of the first source data received from the one or more data source systems (e.g., enterprise user computing device 130, external data source platform 150, external computer system 160), dynamic data stenciling computing platform 110 may determine that the target application hosted by the enterprise application host platform (e.g., enterprise application host platform 120) is the intended recipient of the portion of the first source data received from the one or more data source systems (e.g., enterprise user computing device 130, external data source platform 150, external computer system 160) based on a user request. Such a user request may, for instance, be received by dynamic data stenciling computing platform 110 from enterprise user computing device 130 (e.g., along with any source data received from enterprise user computing device 130).

At step 203, dynamic data stenciling computing platform 110 may select a dynamic data stencil. For example, at step 203, dynamic data stenciling computing platform 110 may select a dynamic data stencil from a plurality of available data stencils (which may, e.g., be maintained by dynamic data stenciling computing platform 110) based on identifying the target application hosted by the enterprise application host platform (e.g., enterprise application host platform 120) as being the intended recipient of the portion of the first source data received from the one or more data source systems (e.g., enterprise user computing device 130, external data source platform 150, external computer system 160). For instance, dynamic data stenciling computing platform 110 may generate, store, and/or otherwise maintain a plurality of data stencils to convert unstructured data into structured data objects that can be processed by other applications, such as the target application hosted by the enterprise application host platform (e.g., enterprise application host platform 120) and/or other applications. As explained in greater detail below, each data stencil may define and/or otherwise correspond to an object template having fields that correspond to fields of an associated target application. Dynamic data stenciling computing platform 110 may, for instance, use a data stencil to load and organize unstructured data into field-associated attributes of a data object, which may then be passed along by dynamic data stenciling computing platform 110 to an associated target application for processing.

Figure 3:
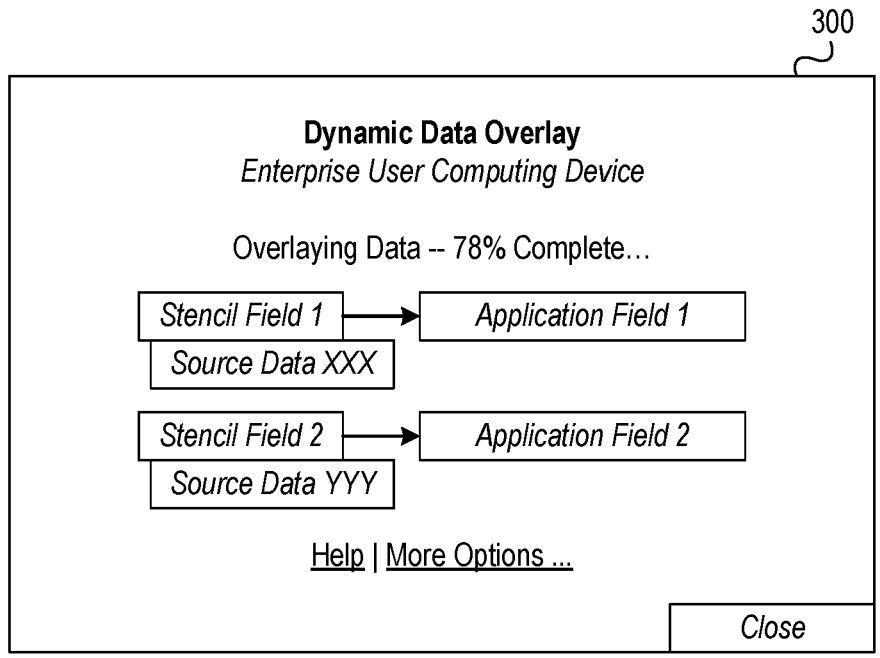
FIGS. 3 and 4 depict example graphical user interfaces for preventing unauthorized access to information resources by deploying and utilizing a dynamic data stenciling system with a smart linking engine in accordance with one or more example embodiments.

At step 204, dynamic data stenciling computing platform 110 may overlay data using the selected stencil. For example, at step 204, dynamic data stenciling computing platform 110 may overlay the portion of the first source data received from the one or more data source systems (e.g., enterprise user computing device 130, external data source platform 150, external computer system 160) onto the target application hosted by the enterprise application host platform (e.g., enterprise application host platform 120) using the dynamic data stencil selected from the plurality of available data stencils. In addition, by overlaying the portion of the first source data received from the one or more data source systems (e.g., enterprise user computing device 130, external data source platform 150, external computer system 160) onto the target application hosted by the enterprise application host platform (e.g., enterprise application host platform 120) using the dynamic data stencil selected from the plurality of available data stencils, dynamic data stenciling computing platform 110 may trigger and/or otherwise cause the target application hosted by the enterprise application host platform (e.g., enterprise application host platform 120) to execute one or more data processing functions using the portion of the first source data received from the one or more data source systems (e.g., enterprise user computing device 130, external data source platform 150, external computer system 160). Additionally or alternatively, in overlaying the portion of the first source data received from the one or more data source systems (e.g., enterprise user computing device 130, external data source platform 150, external computer system 160) onto the target application hosted by the enterprise application host platform (e.g., enterprise application host platform 120) using the dynamic data stencil selected from the plurality of available data stencils, dynamic data stenciling computing platform 110 may trigger and/or otherwise cause enterprise user computing device 130 to display and/or otherwise present a graphical user interface similar to graphical user interface 300, which is illustrated in FIG. 3. As seen in FIG. 3, graphical user interface 300 may include text and/or other information illustrating the portion of the first source data received from the one or more data source systems (e.g., enterprise user computing device 130, external data source platform 150, external computer system 160) being overlaid onto and/or otherwise inserted into the target application hosted by the enterprise application host platform (e.g., enterprise application host platform 120) using the dynamic data stencil selected from the plurality of available data stencils.

In some embodiments, overlaying the portion of the first source data received from the one or more data source systems onto the target application hosted by the enterprise application host platform using the dynamic data stencil selected from the plurality of available data stencils may include: generating a first structured data object having one or more attributes corresponding to one or more fields of the dynamic data stencil selected from the plurality of available data stencils; populating the one or more attributes of the first structured data object with information selected from the first source data received from the one or more data source systems; and sending, via the communication interface, to the enterprise application host platform, the first structured data object. For example, in overlaying the portion of the first source data received from the one or more data source systems (e.g., enterprise user computing device 130, external data source platform 150, external computer system 160) onto the target application hosted by the enterprise application host platform (e.g., enterprise application host platform 120) using the dynamic data stencil selected from the plurality of available data stencils at step 204, dynamic data stenciling computing platform 110 may generate a first structured data object having one or more attributes corresponding to one or more fields of the dynamic data stencil selected from the plurality of available data stencils. Subsequently, dynamic data stenciling computing platform 110 may populate the one or more attributes of the first structured data object with information selected from the first source data received from the one or more data source systems (e.g., enterprise user computing device 130, external data source platform 150, external computer system 160). Then, dynamic data stenciling computing platform 110 may send, via the communication interface (e.g., communication interface 113), to the enterprise application host platform (e.g., enterprise application host platform 120), the first structured data object.

In some embodiments, populating the one or more attributes of the first structured data object with information selected from the first source data received from the one or more data source systems may include: generating a first unique link to first secure data extracted from the first source data received from the one or more data source systems; and inserting the first unique link into the first structured data object. In addition, the first secure data extracted from the first source data received from the one or more data source systems may be retained by the computing platform after the first structured data object is sent to the enterprise application host platform. For example, in populating the one or more attributes of the first structured data object with information selected from the first source data received from the one or more data source systems (e.g., enterprise user computing device 130, external data source platform 150, external computer system 160), dynamic data stenciling computing platform 110 may generate a first unique link to first secure data extracted from the first source data received from the one or more data source systems (e.g., enterprise user computing device 130, external data source platform 150, external computer system 160). Subsequently, dynamic data stenciling computing platform 110 may insert the first unique link into the first structured data object. In addition, the first secure data extracted from the first source data received from the one or more data source systems (e.g., enterprise user computing device 130, external data source platform 150, external computer system 160) may be retained by the computing platform (e.g., dynamic data stenciling computing platform 110) after the first structured data object is sent to the enterprise application host platform (e.g., enterprise application host platform 120). For instance, dynamic data stenciling computing platform 110 may generate and insert a link (e.g., a uniform resource locator or other alias) in place of the first secure data extracted from the first source data received from the one or more data source systems (e.g., enterprise user computing device 130, external data source platform 150, external computer system 160) so as to protect the privacy, security, and/or integrity of such data. In addition, dynamic data stenciling computing platform 110 may retain and/or otherwise store the secure data corresponding to the link, so that when the hosted application on enterprise application host platform 120 requests access to the link, dynamic data stenciling computing platform 110 can authenticate and/or validate enterprise application host platform 120 and subsequently serve the corresponding data.

In some embodiments, generating the first unique link to the first secure data extracted from the first source data received from the one or more data source systems may include setting a first expiration time for the first unique link. For example, in generating the first unique link to the first secure data extracted from the first source data received from the one or more data source systems (e.g., enterprise user computing device 130, external data source platform 150, external computer system 160), dynamic data stenciling computing platform 110 may set a first expiration time for the first unique link. The expiration time for the link may, for instance, cause the link to expire after a specific amount of time (e.g., at which point dynamic data stenciling computing platform 110 may delete the retained data corresponding to the link and/or deny any subsequently received requests to access the retained data corresponding to the link), so as to protect the privacy, security, and/or integrity of the linked data.

In some embodiments, populating the one or more attributes of the first structured data object with information selected from the first source data received from the one or more data source systems may include: prior to generating the first unique link to the first secure data extracted from the first source data received from the one or more data source systems, determining, by a smart linking engine executing on the computing platform, to generate the first unique link to the first secure data extracted from the first source data received from the one or more data source systems based on at least one previous data overlay event. For example, in populating the one or more attributes of the first structured data object with information selected from the first source data received from the one or more data source systems (e.g., enterprise user computing device 130, external data source platform 150, external computer system 160), and prior to generating the first unique link to the first secure data extracted from the first source data received from the one or more data source systems (e.g., enterprise user computing device 130, external data source platform 150, external computer system 160), dynamic data stenciling computing platform 110 may determine, using a smart linking engine (e.g., smart linking engine 112c) executing on the computing platform (e.g., dynamic data stenciling computing platform 110), to generate the first unique link to the first secure data extracted from the first source data received from the one or more data source systems (e.g., enterprise user computing device 130, external data source platform 150, external computer system 160) based on at least one previous data overlay event. For instance, dynamic data stenciling computing platform 110 and/or smart linking engine 112c may learn, over time, what types of data should be considered private and/or secure and thus be linked to, rather than being directly shared with and/or otherwise transmitted to a target application and/or other data endpoints. Thus, dynamic data stenciling computing platform 110 and/or smart linking engine 112c may, for instance, determine to generate the link based on having generated a link for similar data in a previous data overlay event, based on having received configuration input and/or feedback that a link should have been generated for similar data in a previous data overlay event, and/or the like.

Figure 2B:
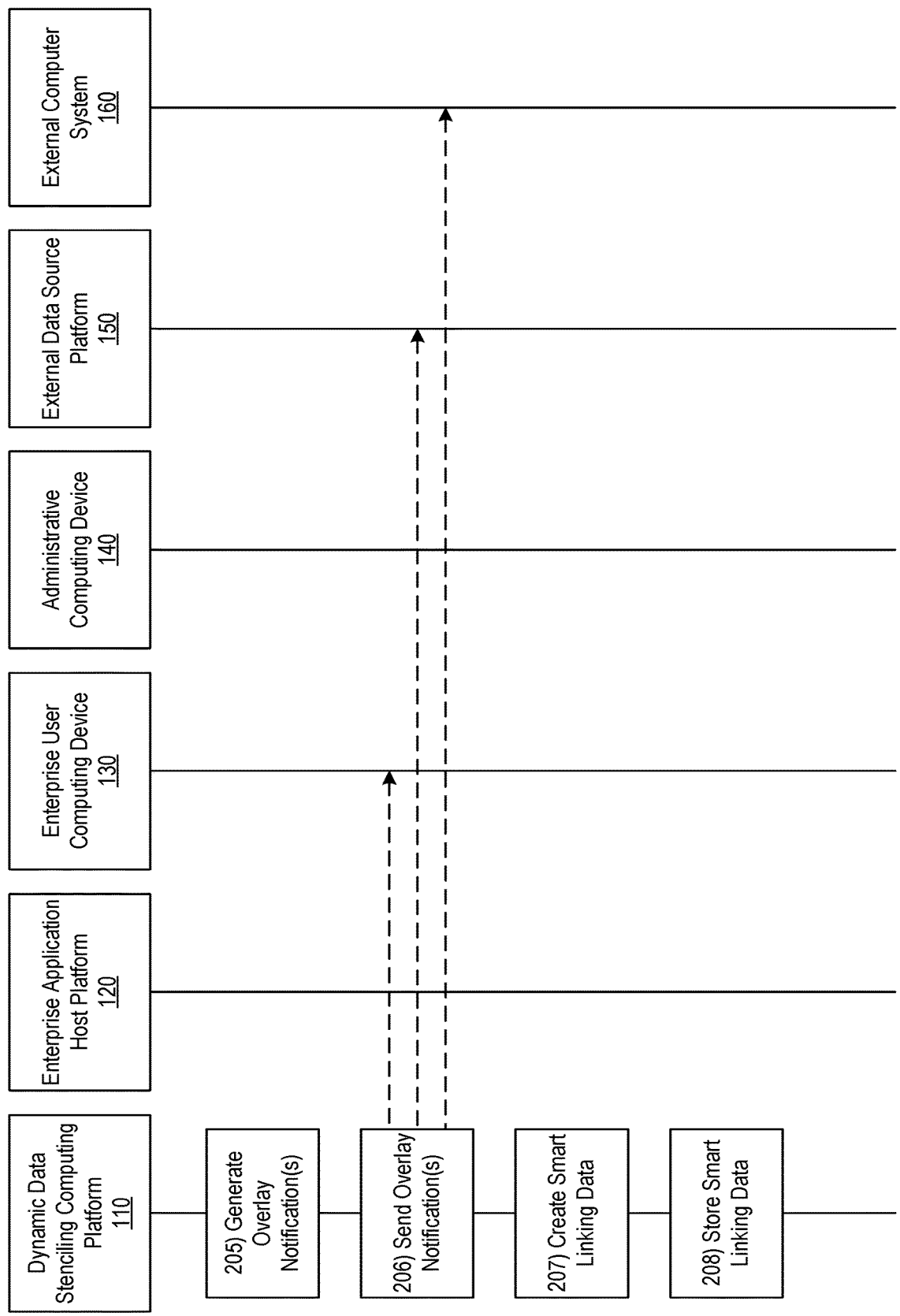

Referring to FIG. 2B, at step 205, dynamic data stenciling computing platform 110 may generate one or more overlay notifications (e.g., indicating that the data overlay event associated with the first source data has been completed). At step 206, dynamic data stenciling computing platform 110 may send the one or more overlay notifications (e.g., to one or more data source systems, such as enterprise user computing device 130, external data source platform 150, and/or external computer system 160). At step 207, dynamic data stenciling computing platform 110 may create smart linking data (e.g., based on the completion of the data overlay event associated with the first source data). For instance, dynamic data stenciling computing platform 110 may create smart linking data indicating that one or more links were generated and/or inserted into a structured data object for data having specific characteristics, data having specific contents, data having specific tags, data originating from specific sources, and/or the like. Any and/or all of this information may, for instance, be used by dynamic data stenciling computing platform 110 and/or smart linking engine 112c in future overlay events (e.g., when determining whether to classify certain data as secure and link to such data instead of inserting the data directly into a structured data object associated with a given overlay event). At step 208, dynamic data stenciling computing platform 110 may store the smart linking data created at step 207.

Referring to FIG. 2C, at step 209, dynamic data stenciling computing platform 110 may detect an update associated with the target application hosted on enterprise application host platform 120. For example, at step 209, after overlaying the portion of the first source data received from the one or more data source systems (e.g., enterprise user computing device 130, external data source platform 150, external computer system 160) onto the target application hosted by the enterprise application host platform (e.g., enterprise application host platform 120) using the dynamic data stencil selected from the plurality of available data stencils, dynamic data stenciling computing platform 110 may detect an update associated with the target application hosted by the enterprise application host platform (e.g., enterprise application host platform 120).

Figure 4:
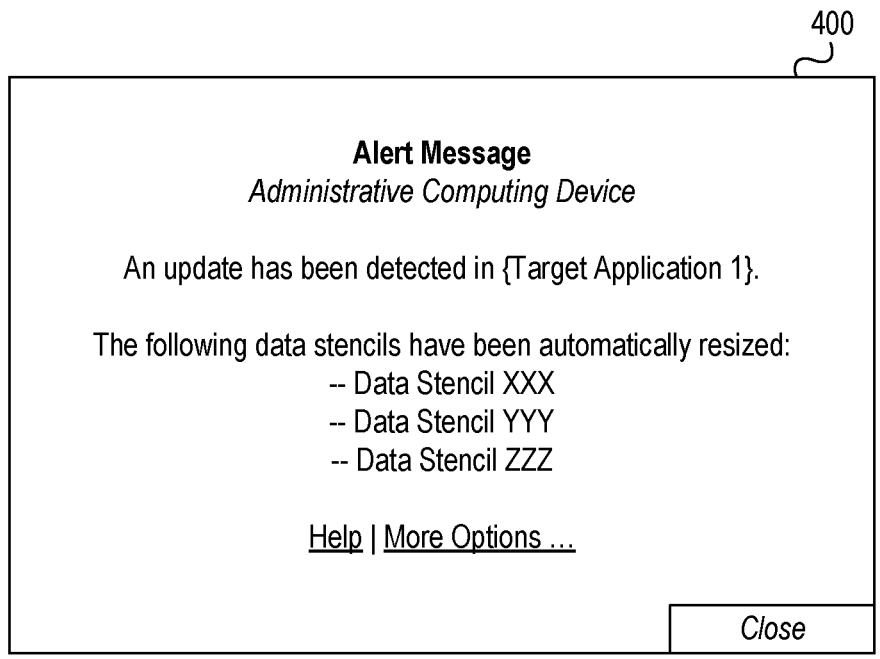

At step 210, dynamic data stenciling computing platform 110 may resize one or more data stencils (e.g., based on the detected update). For example, at step 210, in response to detecting the update associated with the target application hosted by the enterprise application host platform (e.g., enterprise application host platform 120), dynamic data stenciling computing platform 110 may resize one or more data stencils associated with the target application hosted by the enterprise application host platform (e.g., enterprise application host platform 120). For instance, dynamic data stenciling computing platform 110 may resize the dynamic data stencil associated with the target application hosted by the enterprise application host platform (e.g., enterprise application host platform 120) involved in the examples described above. In resizing the data stencil, dynamic data stenciling computing platform 110 may add and/or remove one or more attributes and/or fields from a structured object template associated with a hosted application corresponding to the data stencil, so that the attributes and/or fields of the object template match the new and/or otherwise updated fields which are requested and/or otherwise used by the hosted application. In some instances, in resizing the one or more data stencils associated with the target application hosted by the enterprise application host platform (e.g., enterprise application host platform 120), dynamic data stenciling computing platform 110 may generate and/or send one or more notifications to administrative computing device 140, which may cause administrative computing device 140 to display and/or otherwise present one or more graphical user interfaces similar to graphical user interface 400, which is depicted in FIG. 4. As seen in FIG. 4, graphical user interface 400 may include text and/or other information indicating that an update has been detected in a particular hosted application (e.g., "An update has been detected in {Target Application 1}") and/or text and/or other information indicating that one or more data stencils have been resized and/or otherwise updated (e.g., "The following data stencils have been automatically resized:—Data Stencil XXX—Data Stencil YYY—Data Stencil ZZZ").

At step 211, dynamic data stenciling computing platform 110 may update smart linking data (e.g., based on resizing the one or more stencils). For instance, based on changes made to the one or more stencils, dynamic data stenciling computing platform 110 may determine to generate and/or insert links into structured data objects associated with the one or more stencils for new and/or different types of private and/or other secure data, and dynamic data stenciling computing platform 110 may update the previously created and stored smart linking data to reflect these changes. As in the example discussed above, dynamic data stenciling computing platform 110 may use this and/or other information when determining whether to classify certain data as secure and link to such data instead of inserting the data directly into a structured data object associated with a given overlay event. At step 212, dynamic data stenciling computing platform 110 may store the updated smart linking data created at step 211.

Figure 2D:
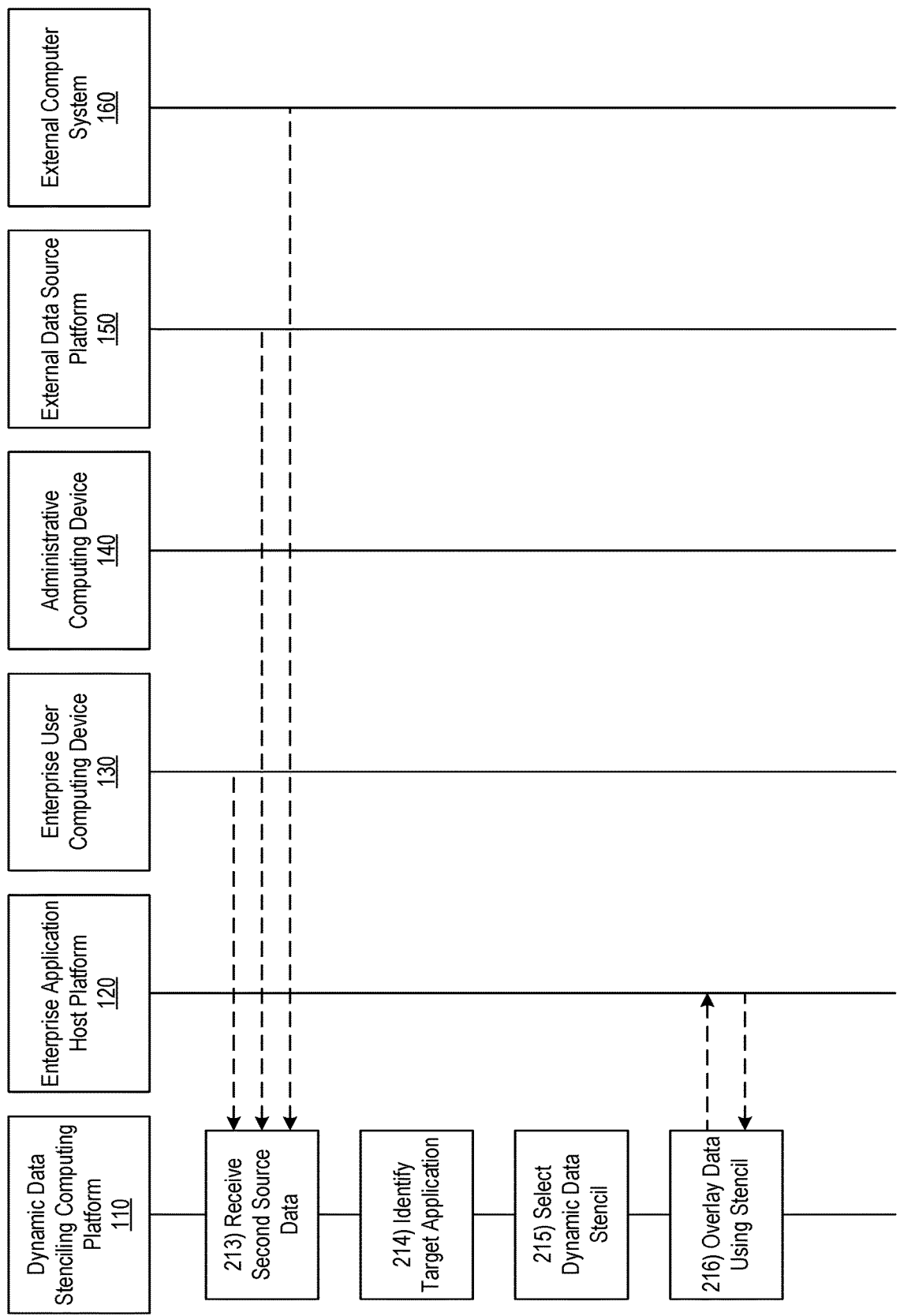

Referring to FIG. 2D, at step 213, dynamic data stenciling computing platform 110 may receive second source data. For example, at step 213, dynamic data stenciling computing platform 110 may receive, via the communication interface (e.g., communication interface 113), from the one or more data source systems, second source data (e.g., enterprise user computing device 130, external data source platform 150, external computer system 160). The second source data may, for instance, be data that is similar to the first source data in the examples discussed above, but may be associated with a different user and/or have other slight differences. For instance, the second source data may include user data associated with a different user than the first source data; the second source data may include transaction data associated with a different user than the first source data; the second source data may include loan application data associated with a different user than the first source data; and/or the second source data may include mortgage application data associated with a different user than the first source data.

At step 214, dynamic data stenciling computing platform 110 may identify a target application. For example, at step 214, dynamic data stenciling computing platform 110 may identify the target application hosted by the enterprise application host platform (e.g., enterprise application host platform 120) as being the intended recipient of a portion of the second source data received from the one or more data source systems (e.g., enterprise user computing device 130, external data source platform 150, external computer system 160). For instance, dynamic data stenciling computing platform 110 may identify the target application hosted by the enterprise application host platform (e.g., enterprise application host platform 120) as being the intended recipient of a portion of the second source data received from the one or more data source systems (e.g., enterprise user computing device 130, external data source platform 150, external computer system 160) similar to how dynamic data stenciling computing platform 110 may identify the target application hosted by the enterprise application host platform (e.g., enterprise application host platform 120) as being the intended recipient of a portion of the first source data received from the one or more data source systems (e.g., enterprise user computing device 130, external data source platform 150, external computer system 160) in the examples discussed above.

At step 215, dynamic data stenciling computing platform 110 may select a dynamic data stencil. For example, at step 215, dynamic data stenciling computing platform 110 may select the dynamic data stencil from the plurality of available data stencils based on identifying the target application hosted by the enterprise application host platform (e.g., enterprise application host platform 120) as being the intended recipient of the portion of the second source data received from the one or more data source systems (e.g., enterprise user computing device 130, external data source platform 150, external computer system 160). For instance, dynamic data stenciling computing platform 110 may select the same dynamic data stencil as used in the examples discussed above, based on recognizing that the second source data received from the one or more data source systems (e.g., enterprise user computing device 130, external data source platform 150, external computer system 160) is similar to the first source data received from the one or more data source systems (e.g., enterprise user computing device 130, external data source platform 150, external computer system 160).

At step 216, dynamic data stenciling computing platform 110 may overlay data using the selected stencil. For example, at step 216, dynamic data stenciling computing platform 110 may overlay the portion of the second source data received from the one or more data source systems (e.g., enterprise user computing device 130, external data source platform 150, external computer system 160) onto the target application hosted by the enterprise application host platform (e.g., enterprise application host platform 120) using the dynamic data stencil selected from the plurality of available data stencils. In addition, by overlaying the portion of the second source data received from the one or more data source systems (e.g., enterprise user computing device 130, external data source platform 150, external computer system 160) onto the target application hosted by the enterprise application host platform (e.g., enterprise application host platform 120) using the dynamic data stencil selected from the plurality of available data stencils, dynamic data stenciling computing platform 110 may cause the target application hosted by the enterprise application host platform (e.g., enterprise application host platform 120) to execute the one or more data processing functions using the portion of the second source data received from the one or more data source systems (e.g., enterprise user computing device 130, external data source platform 150, external computer system 160). Additionally or alternatively, in overlaying the portion of the second source data received from the one or more data source systems (e.g., enterprise user computing device 130, external data source platform 150, external computer system 160) onto the target application hosted by the enterprise application host platform (e.g., enterprise application host platform 120) using the dynamic data stencil selected from the plurality of available data stencils, dynamic data stenciling computing platform 110 may again trigger and/or otherwise cause enterprise user computing device 130 to display and/or otherwise present a graphical user interface similar to graphical user interface 300.

In some embodiments, overlaying the portion of the second source data received from the one or more data source systems onto the target application hosted by the enterprise application host platform using the dynamic data stencil selected from the plurality of available data stencils may include: generating a second structured data object having one or more attributes corresponding to one or more fields of the dynamic data stencil selected from the plurality of available data stencils; populating the one or more attributes of the second structured data object with information selected from the second source data received from the one or more data source systems; and sending, via the communication interface, to the enterprise application host platform, the second structured data object. For example, in overlaying the portion of the second source data received from the one or more data source systems (e.g., enterprise user computing device 130, external data source platform 150, external computer system 160) onto the target application hosted by the enterprise application host platform (e.g., enterprise application host platform 120) using the dynamic data stencil selected from the plurality of available data stencils at step 216, dynamic data stenciling computing platform 110 may generate a second structured data object having one or more attributes corresponding to one or more fields of the dynamic data stencil selected from the plurality of available data stencils. Subsequently, dynamic data stenciling computing platform 110 may populate the one or more attributes of the second structured data object with information selected from the second source data received from the one or more data source systems (e.g., enterprise user computing device 130, external data source platform 150, external computer system 160). Then, dynamic data stenciling computing platform 110 may send, via the communication interface (e.g., communication interface 113), to the enterprise application host platform (e.g., enterprise application host platform 120), the second structured data object.

In some embodiments, populating the one or more attributes of the second structured data object with information selected from the second source data received from the one or more data source systems may include: generating a second unique link to second secure data extracted from the second source data received from the one or more data source systems; and inserting the second unique link into the second structured data object. In addition, the second secure data extracted from the second source data received from the one or more data source systems may be retained by the computing platform after the second structured data object is sent to the enterprise application host platform. For example, in populating the one or more attributes of the second structured data object with information selected from the second source data received from the one or more data source systems (e.g., enterprise user computing device 130, external data source platform 150, external computer system 160), dynamic data stenciling computing platform 110 may generate a second unique link to second secure data extracted from the second source data received from the one or more data source systems (e.g., enterprise user computing device 130, external data source platform 150, external computer system 160). Subsequently, dynamic data stenciling computing platform 110 may insert the second unique link into the second structured data object. In addition, the second secure data extracted from the second source data received from the one or more data source systems (e.g., enterprise user computing device 130, external data source platform 150, external computer system 160) may be retained by the computing platform (e.g., dynamic data stenciling computing platform 110) after the second structured data object is sent to the enterprise application host platform (e.g., enterprise application host platform 120). For instance, dynamic data stenciling computing platform 110 may generate and insert a link (e.g., a uniform resource locator or other alias) in place of the second secure data extracted from the second source data received from the one or more data source systems (e.g., enterprise user computing device 130, external data source platform 150, external computer system 160) so as to protect the privacy, security, and/or integrity of such data. In addition, dynamic data stenciling computing platform 110 may retain and/or otherwise store the secure data corresponding to the link, so that when the hosted application on enterprise application host platform 120 requests access to the link, dynamic data stenciling computing platform 110 can authenticate and/or validate enterprise application host platform 120 and subsequently serve the corresponding data.

In some embodiments, generating the second unique link to the second secure data extracted from the second source data received from the one or more data source systems may include setting a second expiration time for the second unique link. For example, in generating the second unique link to the second secure data extracted from the second source data received from the one or more data source systems (e.g., enterprise user computing device 130, external data source platform 150, external computer system 160), dynamic data stenciling computing platform 110 may set a second expiration time for the second unique link. The expiration time for the link may, for instance, cause the link to expire after a specific amount of time (e.g., at which point dynamic data stenciling computing platform 110 may delete the retained data corresponding to the link and/or deny any subsequently received requests to access the retained data corresponding to the link), so as to protect the privacy, security, and/or integrity of the linked data.

In some embodiments, populating the one or more attributes of the second structured data object with information selected from the second source data received from the one or more data source systems may include: prior to generating the second unique link to the second secure data extracted from the second source data received from the one or more data source systems, determining, by a smart linking engine executing on the computing platform, to generate the second unique link to the second secure data extracted from the second source data received from the one or more data source systems based on at least one previous data overlay event. For example, in populating the one or more attributes of the second structured data object with information selected from the second source data received from the one or more data source systems (e.g., enterprise user computing device 130, external data source platform 150, external computer system 160), and prior to generating the second unique link to the second secure data extracted from the second source data received from the one or more data source systems (e.g., enterprise user computing device 130, external data source platform 150, external computer system 160), dynamic data stenciling computing platform 110 may determine, using a smart linking engine (e.g., smart linking engine 112c) executing on the computing platform (e.g., dynamic data stenciling computing platform 110), to generate the second unique link to the second secure data extracted from the second source data received from the one or more data source systems (e.g., enterprise user computing device 130, external data source platform 150, external computer system 160) based on at least one previous data overlay event. For instance, and as discussed above, dynamic data stenciling computing platform 110 and/or smart linking engine 112c may learn, over time, what types of data should be considered private and/or secure and thus be linked to, rather than being directly shared with and/or otherwise transmitted to a target application and/or other data endpoints. Thus, dynamic data stenciling computing platform 110 and/or smart linking engine 112c may, for instance, determine to generate the link based on having generated a link for similar data in a previous data overlay event, based on having received configuration input and/or feedback that a link should have been generated for similar data in a previous data overlay event, and/or the like.

In some embodiments, determining, by the smart linking engine executing on the computing platform, to generate the second unique link to the second secure data extracted from the second source data received from the one or more data source systems based on the at least one previous data overlay event may include determining to generate the second unique link to the second secure data extracted from the second source data received from the one or more data source systems based on a previous data overlay event involving the first source data received from the one or more data source systems. For example, in determining to generate the second unique link to the second secure data extracted from the second source data received from the one or more data source systems (e.g., enterprise user computing device 130, external data source platform 150, external computer system 160) based on the at least one previous data overlay event, smart linking engine 112c and/or dynamic data stenciling computing platform 110 may determine to generate the second unique link to the second secure data extracted from the second source data received from the one or more data source systems (e.g., enterprise user computing device 130, external data source platform 150, external computer system 160) based on a previous data overlay event involving the first source data received from the one or more data source systems (e.g., enterprise user computing device 130, external data source platform 150, external computer system 160). For instance, smart linking engine 112c and/or dynamic data stenciling computing platform 110 may determine to generate the second unique link to the second secure data extracted from the second source data received from the one or more data source systems (e.g., enterprise user computing device 130, external data source platform 150, external computer system 160) based on the data overlay event involving the first source data described in the examples above with respect to steps 201 to 204. In making this determination, smart linking engine 112c and/or dynamic data stenciling computing platform 110 may determine to generate the second unique link based on recognizing and/or otherwise identifying similarities between the second secure data extracted from the second source data received from the one or more data source systems (e.g., enterprise user computing device 130, external data source platform 150, external computer system 160) and the first secure data extracted from the first source data received from the one or more data source systems (e.g., enterprise user computing device 130, external data source platform 150, external computer system 160) in the examples described above.

Figure 2E:
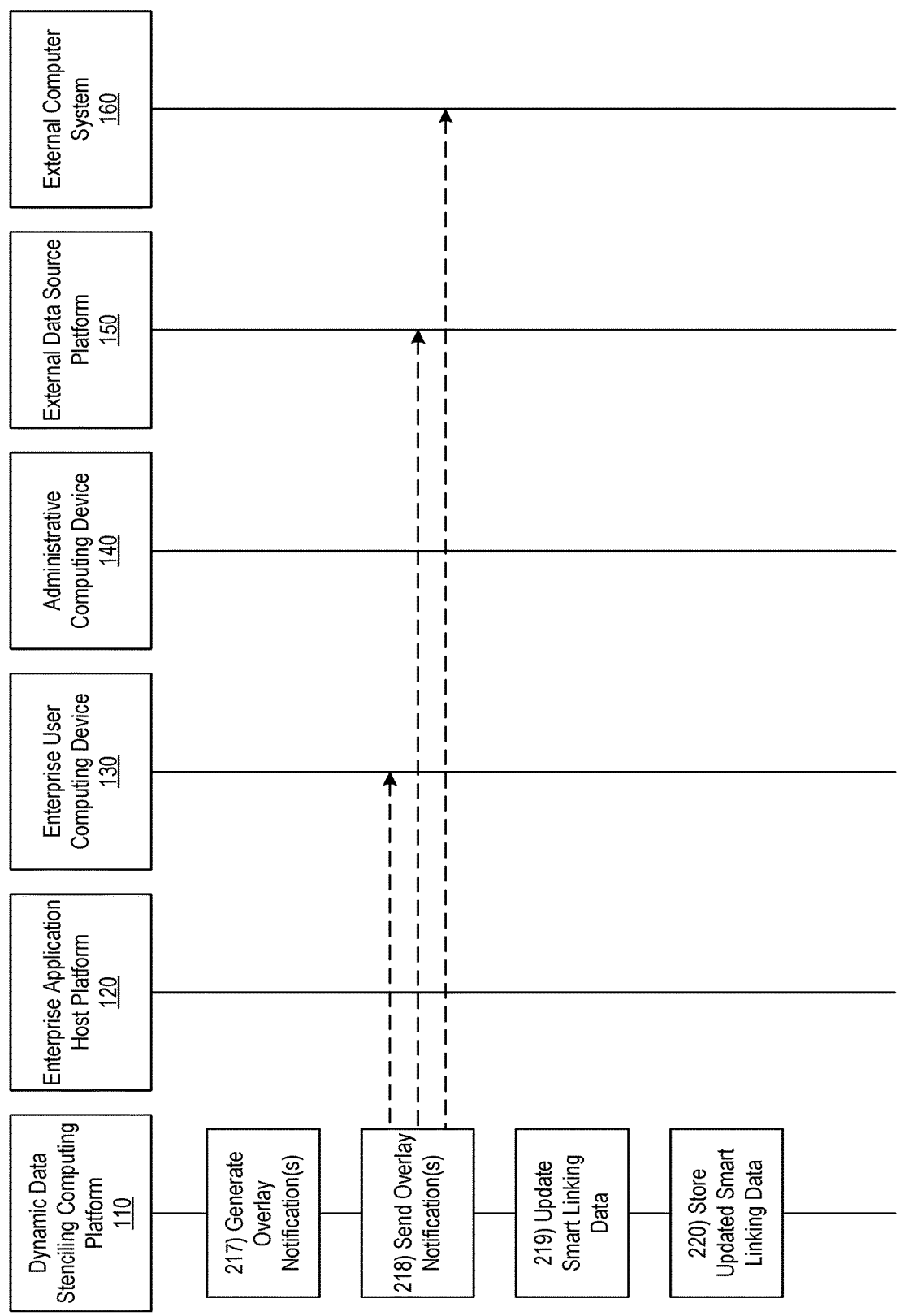

Referring to FIG. 2E, at step 217, dynamic data stenciling computing platform 110 may generate one or more overlay notifications (e.g., indicating that the data overlay event associated with the second source data has been completed). At step 218, dynamic data stenciling computing platform 110 may send the one or more overlay notifications (e.g., to one or more data source systems, such as enterprise user computing device 130, external data source platform 150, and/or external computer system 160). At step 219, dynamic data stenciling computing platform 110 may update the smart linking data (e.g., based on the completion of the data overlay event associated with the second source data). For instance, dynamic data stenciling computing platform 110 may update the smart linking data to indicate that one or more links were generated and/or inserted into a structured data object for data having specific characteristics, data having specific contents, data having specific tags, data originating from specific sources, and/or the like. Any and/or all of this information may, for instance, be used by dynamic data stenciling computing platform 110 and/or smart linking engine 112c in future overlay events (e.g., when determining whether to classify certain data as secure and link to such data instead of inserting the data directly into a structured data object associated with a given overlay event). At step 220, dynamic data stenciling computing platform 110 may store the updated smart linking data created at step 219.

Figure 5:
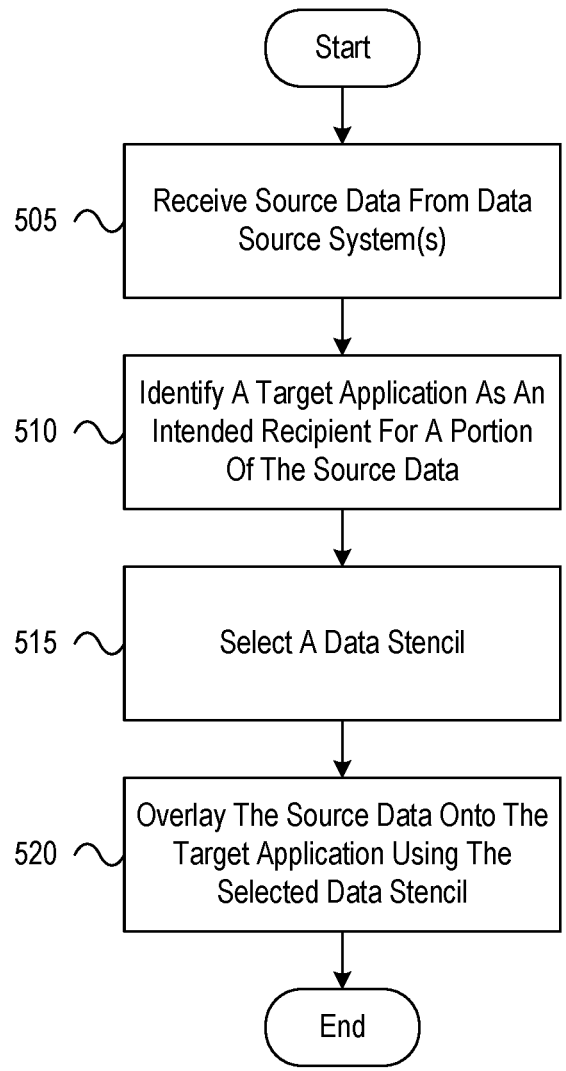
FIG. 5 depicts an illustrative method for preventing unauthorized access to information resources by deploying and utilizing a dynamic data stenciling system with a smart linking engine in accordance with one or more example embodiments.

FIG. 5 depicts an illustrative method for preventing unauthorized access to information resources by deploying and utilizing a dynamic data stenciling system with a smart linking engine in accordance with one or more example embodiments. Referring to FIG. 5, at step 505, a computing platform having at least one processor, a communication interface, and memory may receive, via the communication interface, from one or more data source systems, first source data. At step 510, the computing platform may identify a target application hosted by an enterprise application host platform as being an intended recipient of a portion of the first source data received from the one or more data source systems. At step 515, the computing platform may select a dynamic data stencil from a plurality of available data stencils based on identifying the target application hosted by the enterprise application host platform as being the intended recipient of the portion of the first source data received from the one or more data source systems. At step 520, the computing platform may overlay the portion of the first source data received from the one or more data source systems onto the target application hosted by the enterprise application host platform using the dynamic data stencil selected from the plurality of available data stencils, and overlaying the portion of the first source data received from the one or more data source systems onto the target application hosted by the enterprise application host platform using the dynamic data stencil selected from the plurality of available data stencils may cause the target application hosted by the enterprise application host platform to execute one or more data processing functions using the portion of the first source data received from the one or more data source systems.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, via the communication interface, from one or more data source systems, first source data;
   identify a target application hosted by an enterprise application host platform as being an intended recipient of a portion of the first source data received from the one or more data source systems;
   select a dynamic data stencil from a plurality of available data stencils based on identifying the target application hosted by the enterprise application host platform as being the intended recipient of the portion of the first source data received from the one or more data source systems; and
   overlay the portion of the first source data received from the one or more data source systems onto the target application hosted by the enterprise application host platform using the dynamic data stencil selected from the plurality of available data stencils, wherein overlaying the portion of the first source data received from the one or more data source systems onto the target application hosted by the enterprise application host platform using the dynamic data stencil selected from the plurality of available data stencils causes the target application hosted by the enterprise application host platform to execute one or more data processing functions using the portion of the first source data received from the one or more data source systems and wherein overlaying the portion of the first source data received from the one or more data source systems onto the target application hosted by the enterprise application host platform using the dynamic data stencil selected from the plurality of available data stencils comprises:
      generating a first structured data object having one or more attributes corresponding to one or more fields of the dynamic data stencil selected from the plurality of available data stencils;
      populating the one or more attributes of the first structured data object with information selected from the first source data received from the one or more data source systems, wherein populating the one or more attributes of the first structured data object with information selected from the first source data received from the one or more data source systems comprises:
         generating a first unique link to first secure data extracted from the first source data received from the one or more data source systems; and
         inserting the first unique link into the first structured data object,
         wherein the first secure data extracted from the first source data received from the one or more data source systems is retained by the computing platform after the first structured data object is sent to the enterprise application host platform; and
      sending, via the communication interface, to the enterprise application host platform, the first structured data object.

2. The computing platform of claim 1, wherein receiving the first source data from the one or more data source systems comprises receiving at least part of the first source data from an enterprise user computing device that is associated with an internal enterprise user and located inside of an enterprise firewall.

3. The computing platform of claim 1, wherein receiving the first source data from the one or more data source systems comprises receiving at least part of the first source data from an external data source platform that is associated with an external third-party entity and located outside of an enterprise firewall.

4. The computing platform of claim 1, wherein receiving the first source data from the one or more data source systems comprises receiving at least part of the first source data from an external computer system that is associated with an external enterprise user and located outside of an enterprise firewall.

5. The computing platform of claim 1, wherein identifying the target application hosted by the enterprise application host platform as being the intended recipient of the portion of the first source data received from the one or more data source systems comprises determining that the target application hosted by the enterprise application host platform is the intended recipient of the portion of the first source data received from the one or more data source systems based on contents of the first source data received from the one or more data source systems.

6. The computing platform of claim 1, wherein identifying the target application hosted by the enterprise application host platform as being the intended recipient of the portion of the first source data received from the one or more data source systems comprises determining that the target application hosted by the enterprise application host platform is the intended recipient of the portion of the first source data received from the one or more data source systems based on a user request.

7. The computing platform of claim 1, wherein generating the first unique link to the first secure data extracted from the first source data received from the one or more data source systems comprises setting a first expiration time for the first unique link.

8. The computing platform of claim 1, wherein populating the one or more attributes of the first structured data object with information selected from the first source data received from the one or more data source systems comprises:
   prior to generating the first unique link to the first secure data extracted from the first source data received from the one or more data source systems, determining, by a smart linking engine executing on the computing platform, to generate the first unique link to the first secure data extracted from the first source data received from the one or more data source systems based on at least one previous data overlay event.

9. The computing platform of claim 1, wherein the memory stores additional computer-readable instructions that, when executed by the at least one processor, cause the computing platform to:
   after overlaying the portion of the first source data received from the one or more data source systems onto the target application hosted by the enterprise application host platform using the dynamic data stencil selected from the plurality of available data stencils:
   detect an update associated with the target application hosted by the enterprise application host platform; and
   in response to detecting the update associated with the target application hosted by the enterprise application host platform, resize one or more data stencils associated with the target application hosted by the enterprise application host platform.

10. The computing platform of claim 9, wherein the memory stores additional computer-readable instructions that, when executed by the at least one processor, cause the computing platform to:

receive, via the communication interface, from the one or more data source systems, second source data;

identify the target application hosted by the enterprise application host platform as being the intended recipient of a portion of the second source data received from the one or more data source systems;

select the dynamic data stencil from the plurality of available data stencils based on identifying the target application hosted by the enterprise application host platform as being the intended recipient of the portion of the second source data received from the one or more data source systems; and overlay the portion of the second source data received from the one or more data source systems onto the target application hosted by the enterprise application host platform using the dynamic data stencil selected from the plurality of available data stencils, wherein overlaying the portion of the second source data received from the one or more data source systems onto the target application hosted by the enterprise application host platform using the dynamic data stencil selected from the plurality of available data stencils causes the target application hosted by the enterprise application host platform to execute the one or more data processing functions using the portion of the second source data received from the one or more data source systems.

11. The computing platform of claim 10, wherein overlaying the portion of the second source data received from the one or more data source systems onto the target application hosted by the enterprise application host platform using the dynamic data stencil selected from the plurality of available data stencils comprises:

generating a second structured data object having one or more attributes corresponding to one or more fields of the dynamic data stencil selected from the plurality of available data stencils;

populating the one or more attributes of the second structured data object with information selected from the second source data received from the one or more data source systems; and sending, via the communication interface, to the enterprise application host platform, the second structured data object.

12. The computing platform of claim 11, wherein populating the one or more attributes of the second structured data object with information selected from the second source data received from the one or more data source systems comprises:

generating a second unique link to second secure data extracted from the second source data received from the one or more data source systems; and inserting the second unique link into the second structured data object, wherein the second secure data extracted from the second source data received from the one or more data source systems is retained by the computing platform after the second structured data object is sent to the enterprise application host platform.

13. The computing platform of claim 12, wherein generating the second unique link to the second secure data extracted from the second source data received from the one or more data source systems comprises setting a second expiration time for the second unique link.

14. The computing platform of claim 12, wherein populating the one or more attributes of the second structured data object with information selected from the second source data received from the one or more data source systems comprises:

prior to generating the second unique link to the second secure data extracted from the second source data received from the one or more data source systems, determining, by a smart linking engine executing on the computing platform, to generate the second unique link to the second secure data extracted from the second source data received from the one or more data source systems based on at least one previous data overlay event.

15. The computing platform of claim 14, wherein determining, by the smart linking engine executing on the computing platform, to generate the second unique link to the second secure data extracted from the second source data received from the one or more data source systems based on the at least one previous data overlay event comprises determining to generate the second unique link to the second secure data extracted from the second source data received from the one or more data source systems based on a previous data overlay event involving the first source data received from the one or more data source systems.

16. A method, comprising:

at a computing platform comprising at least one processor, a communication interface, and memory:

receiving, by the at least one processor, via the communication interface, from one or more data source systems, first source data;

identifying, by the at least one processor, a target application hosted by an enterprise application host platform as being an intended recipient of a portion of the first source data received from the one or more data source systems;

selecting, by the at least one processor, a dynamic data stencil from a plurality of available data stencils based on identifying the target application hosted by the enterprise application host platform as being the intended recipient of the portion of the first source data received from the one or more data source systems; and overlaying, by the at least one processor, the portion of the first source data received from the one or more data source systems onto the target application hosted by the enterprise application host platform using the dynamic data stencil selected from the plurality of available data stencils, wherein overlaying the portion of the first source data received from the one or more data source systems onto the target application hosted by the enterprise application host platform using the dynamic data stencil selected from the plurality of available data stencils causes the target application hosted by the enterprise application host platform to execute one or more data processing functions using the portion of the first source data received from the one or more data source systems and wherein overlaying the portion of the first source data received from the one or more data source systems onto the target application hosted by the enterprise application host platform using the dynamic data stencil selected from the plurality of available data stencils comprises:

generating a first structured data object having one or more attributes corresponding to one or more fields of the dynamic data stencil selected from the plurality of available data stencils;
populating the one or more attributes of the first structured data object with information selected from the first source data received from the one or more data source systems, wherein populating the one or more attributes of the first structured data object with information selected from the first source data received from the one or more data source systems comprises:
generating a first unique link to first secure data extracted from the first source data received from the one or more data source systems; and
inserting the first unique link into the first structured data object,
wherein the first secure data extracted from the first source data received from the one or more data source systems is retained by the computing platform after the first structured data object is sent to the enterprise application host platform; and
sending, via the communication interface, to the enterprise application host platform, the first structured data object.

17. One or more non-transitory computer-readable media storing instructions that, when executed by a computing platform comprising at least one processor, a communication interface, and memory, cause the computing platform to:
receive, via the communication interface, from one or more data source systems, first source data;
identify a target application hosted by an enterprise application host platform as being an intended recipient of a portion of the first source data received from the one or more data source systems;
select a dynamic data stencil from a plurality of available data stencils based on identifying the target application hosted by the enterprise application host platform as being the intended recipient of the portion of the first source data received from the one or more data source systems; and
overlay the portion of the first source data received from the one or more data source systems onto the target application hosted by the enterprise application host platform using the dynamic data stencil selected from the plurality of available data stencils, wherein overlaying the portion of the first source data received from the one or more data source systems onto the target application hosted by the enterprise application host platform using the dynamic data stencil selected from the plurality of available data stencils causes the target application hosted by the enterprise application host platform to execute one or more data processing functions using the portion of the first source data received from the one or more data source systems and wherein overlaying the portion of the first source data received from the one or more data source systems onto the target application hosted by the enterprise application host platform using the dynamic data stencil selected from the plurality of available data stencils comprises:
generating a first structured data object having one or more attributes corresponding to one or more fields of the dynamic data stencil selected from the plurality of available data stencils;
populating the one or more attributes of the first structured data object with information selected from the first source data received from the one or more data source systems, wherein populating the one or more attributes of the first structured data object with information selected from the first source data received from the one or more data source systems comprises:
generating a first unique link to first secure data extracted from the first source data received from the one or more data source systems; and
inserting the first unique link into the first structured data object,
wherein the first secure data extracted from the first source data received from the one or more data source systems is retained by the computing platform after the first structured data object is sent to the enterprise application host platform; and
sending, via the communication interface, to the enterprise application host platform, the first structured data object.

* * * * *